United States Patent Office 3,105,140
Patented Sept. 24, 1963

3,105,140
METHODS OF ARC WELDING IN AN INERT GAS ATMOSPHERE
Eric Anthony Horbury, Loughborough, Leicester, Albert Frederick Dix, Birstall, Leicester, and Ronald Parkin, Quorn, Leicester, England, assignors to Rolls-Royce Limited, Derby, England, a British company
No Drawing. Filed July 3, 1961, Ser. No. 121,307
Claims priority, application Great Britain Dec. 24, 1960
3 Claims. (Cl. 219—137)

This invention relates to the heat treatment of metals. The term "metal" as used herein includes alloys.

This invention provides a process for arc-welding ferrous metal surfaces wherein the surfaces to be arc-welded prior to the welding are coated with at least one protective layer of a coating composition consisting essentially of an organophilic cation-modified clay and an organic solvent and are thereafter arc-welded at normal fusion welding temperatures in an inert gas atmosphere, e.g. of argon.

The metal surfaces may be inert gas shield arc-welded by conventional methods, the resulting surface deposits being removed by chemical processing or abrasive cleaning.

The arc-welding process may for example be applied to mild steel sheets for example of the material known as Fortiweld.

Although conventional techniques, such as brushing and dipping may be used for applying the coating, it is preferred to apply the coating in a series of thin layers by spraying the coating on to the metal surface, each spray coating being thoroughly dried in air before application of a further coating.

The term "organophilic cation-modified clay" as used herein means a clay modified by covering the greater part of the surface of the particles of the clay with alkyl or aryl organic radicals coupled to the clay ionically by means of an onium base.

An onium compound has been defined in Hackh's Chemical Dictionary—Second Edition—as "A group of organic compounds of the type $RXH_y$ which are isologs of ammonium and contain the element X in its highest positive valency; where X is pentavalent as in ammonium, phosphonium, arsonium and stibonium; where X is tetravalent as in oxonium, sulphonium, selenonium and stannonium compounds and, where X is trivalent, as in iodonium compounds."

They may be further considered as addition compounds, this being further described under the heading of oxonium, carbonium, stilbonium, -inium, -ylium.

The cation-modified clay may be produced for example by converting the organic bases to the salts formed by the addition of an acid such as hydrochloric or acetic acid dissolved in water, and adding the selected onium compound to an aqueous clay dispersion.

The term "clay" as used herein includes montmorillonite, that is, sodium, potassium, lithium and other bentonites, particularly those of the Wyoming and South Dakota (U.S.A.) types, magnesium bentonite sometimes called hectorite and saponite, nentronite and like synthetic base exchange materials.

Details of the preparation of organophilic cation-modified clays are given in British Patents Nos. 664,830 and 782,724 and U.S.A. Patent No. 2,531,440.

Examples of organophilic clays which may be used are dimethyldioctadecyl ammonium montmorillonite, dodecylamine montmorillonite and dimethyldioctadecyl ammonium hectorite. These organophilic clays may be dispersed in one or more liquid organic media. Examples of liquid organic media which may be used are highly polar liquids such as aliphatic alcohols including monohydric alcohols such as methanol, ethanol and propanol; aliphatic esters including ethyl acetate, butyl acetate and amyl acetate; and aliphatic ketones including acetone, methyl ethyl ketone and methyl isobutyl ketone; less polar liquids such as dibutyl phthalate, polyesters, polyamides and alkyd resins; and slightly polar liquids such as aromatic hydrocarbons including benzene, toluene, para and meta xylenes, naphtha, turpentine and dipentene; mineral oils and mineral spirits such as white spirit; and aliphatic hydrocarbons such as hexane and heptane.

The metal surfaces to be treated may be degreased, if necessary, first by paraffin washing if particularly greasy and then by a trichlorethylene vapour degreasing process to remove organic materials and any paint present may be removed by a paint stripper such as methylene chloride. Liquid organic media which are particularly useful because of their non-inflammable properties are halogenated aliphatic hydrocarbons such as trichlorethylene and perchlorethylene. Under suitable circumstances it has been found possible to use aqueous emulsions of the organophilic clays.

After the welding any scale present may be removed in the case of stainless steel by spraying with high pressure water followed by immersion in concentrated hydrochloric acid and washing with water.

In the case of mild steel the scale may be removed by immersion in inhibited concentrated hydrochloric acid followed by washing in water. Alternatively in each case the scale may be removed by abrasive cleaning.

Arc-welding by the process of the invention has the following advantages:

(a) Marked reduction in porosity and consequent reduction in the number of scrap parts.

(b) Improved and consistent weld-bead contour, especially on welding thin gauge materials, i.e. material of the order of 22 to 40 thousandths of an inch.

(c) Reduced heat input necessary to produce a satisfactory weld penetration.

(d) Easy removal leaving the entire part including the weld very clean.

The following example, in which the parts are by weight, except where otherwise stated, illustrates the invention.

*Example*

100 gms. of dimethyldioctadecyl ammonium montmorillonite of the grade sold as Bentone 34, the word "Bentone" being a registered trademark, were milled with 5 gms. of an oil-soluble dye, added as a witness of coverage, and 1,000 mls. of toluene in a stainless steel ball mill using stainless steel balls for four hours. This mixture was diluted with 1,000 mls. of toluene and again milled for half an hour. The resultant mixture was then diluted with toluene until it was in the proportion of 20 gms. per litre of Bentone 34 in toluene.

Sheets of mild steel (Fortiweld) were arc-welded as follows:

(1) The metal surfaces of the sheets being particularly greasy, were washed with paraffin and then treated with trichlorethylene vapour to remove any organic material. Paint was removed by treatment with methylene chloride. Heavy oxide scale which is formed during the manufacture of the metal sheet, was removed by abrasive cleaning.

(2) As soon as possible after step 1 the metal surfaces to be welded were sprayed with a coating of Bentone 34 in toluene prepared as described above and allowed to dry in air for 10 minutes.

(3) The two surfaces were then argon arc-welded using conventional argon arc-welding equipment.

(4) Residual Bentone 34 was then removed by abrasive cleaning.

The resulting weld-bead was superior to that achieved without the use of the modified clay in the following respects:

(a) Marked reduction in porosity and consequent reduction in the number of scrap parts.

(b) Improved and consistent weld-bead contour, especially on welding thin gauge materials, i.e. material of the order of 22 to 40 thousandths of an inch.

(c) Reduced heat input necessary to produce a satisfactory weld penetration.

(d) Easy removal leaving the entire part including the weld very clean.

The above example was repeated but using instead of the Bentone 34, dodecylmontmorillonite (sold under the registered trademark Bentone 18C) and dimethyldioctadecyl ammonium hectorite (sold under the registered trademark Bentone 38) and similar results were obtained.

We claim:

1. A process for arc-welding ferrous metal surfaces which comprises coating the surfaces to be arc-welded prior to the welding with at least one protective layer of a sprayable coating composition consisting essentially of an organophilic cation-modified clay and an organic solvent, drying the layer to deposit a film of said clay on the metal surfaces to be arc-welded and thereafter arc-welding the surfaces at normal fusion welding temperature in an inert gas atmosphere.

2. A process for arc-welding ferrous metal surfaces which comprises coating the surfaces to be arc-welded prior to the welding with at least one protective layer of a sprayable coating composition consisting essentially of an organophilic cation-modified clay, a binder and an organic solvent, drying the layer to deposit a film of said clay on the surfaces to be arc-welded and thereafter arc-welding the surfaces at normal fusion welding temperature in an inert gas atmosphere.

3. A process for arc-welding surfaces of thin gauge mild steel sheets which comprises coating the surfaces to be arc-welded prior to the welding with at least one protective layer of a sprayable coating composition consisting essentially of a toluene solution of dimethyldioctadecyl ammonium montmorillonite, drying the layer to deposit a film of said clay on the sheet surfaces to be arc-welded and thereafter arc-welding the surfaces at normal fusion welding temperature in an argon atmosphere.

References Cited in the file of this patent

UNITED STATES PATENTS

| | | |
|---|---|---|
| 1,978,316 | Miller | Oct. 23, 1934 |
| 2,473,600 | Labosco | June 21, 1949 |
| 2,473,601 | Labosco | June 21, 1949 |
| 2,531,440 | Jordan | Nov. 28, 1950 |
| 2,898,253 | Schneider | Aug. 4, 1959 |